United States Patent [19]

Hessman et al.

[11] Patent Number: 4,938,638

[45] Date of Patent: Jul. 3, 1990

[54] MILLING CUTTER

[75] Inventors: Anders B. I. Hessman, Sandviken; Leif R. Nyström, Järbo, both of Sweden

[73] Assignee: Sandvik AB, Sandviken, Sweden

[21] Appl. No.: 313,992

[22] Filed: Feb. 23, 1989

[30] Foreign Application Priority Data

Mar. 11, 1988 [SE] Sweden .................... 8800873-5

[51] Int. Cl.$^5$ ............................ B23C 5/24; B23C 5/06
[52] U.S. Cl. ...................................... 407/39; 407/38; 407/41
[58] Field of Search .................. 407/36, 37, 38, 39, 407/40, 41, 93, 94

[56] References Cited

U.S. PATENT DOCUMENTS

| | | | |
|---|---|---|---|
| 3,195,376 | 7/1965 | Bader | 408/146 |
| 3,298,107 | 1/1967 | Bergstrom | 407/39 |
| 3,512,236 | 5/1970 | Renaud | 407/41 |
| 3,624,879 | 12/1971 | Ayer | 407/41 |
| 3,757,397 | 9/1973 | Lindsay | 407/49 |
| 3,847,555 | 11/1974 | Pegler et al. | 407/36 |
| 4,264,245 | 4/1981 | Lindsay | 407/41 |
| 4,329,091 | 5/1982 | Erkfritz | 407/41 |
| 4,533,281 | 8/1985 | Lacey | 407/36 |
| 4,627,771 | 12/1986 | Kieninger | 407/39 |

FOREIGN PATENT DOCUMENTS

| | | | |
|---|---|---|---|
| 0282090 | 9/1988 | European Pat. Off. | 407/37 |
| 0132472 | 10/1978 | German Democratic Rep. | 407/93 |

Primary Examiner—William Terrell
Attorney, Agent, or Firm—Burns, Doane, Swecker & Mathis

[57] ABSTRACT

A milling cutter for chip machining is equipped with adjustable cutting inserts. The milling cutter comprises a tool body having a plurality of peripheral recesses. Each recess is adapted to receive a cutting insert, a support element for defining a support surface against which the insert abuts, an adjustment element for adjusting the position of the cutting insert in a first direction, and a wedge for securing the insert. The adjustment element is threadedly connected to the support element for rotation relative thereto when adjusting the insert. The support element could also include a rotatable portion for adjusting the insert in a second direction.

9 Claims, 4 Drawing Sheets

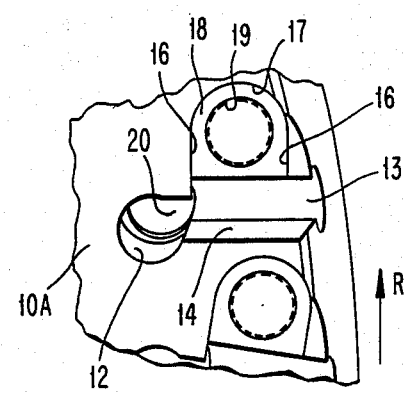
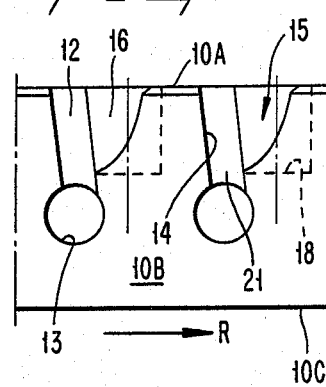
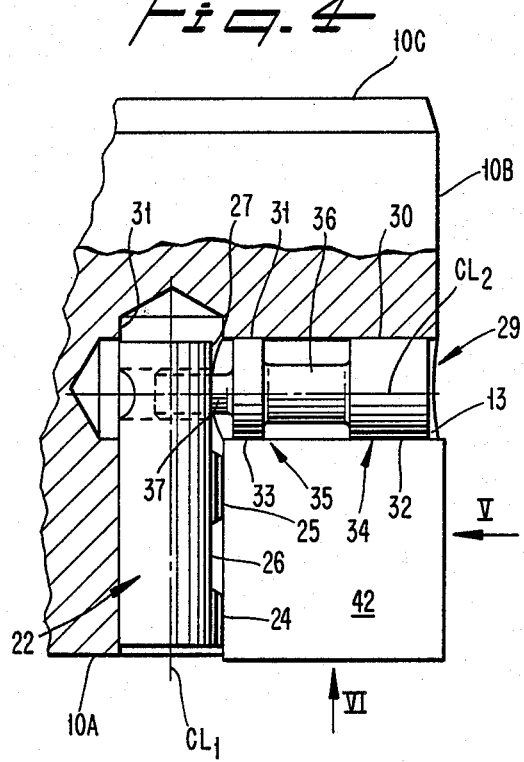
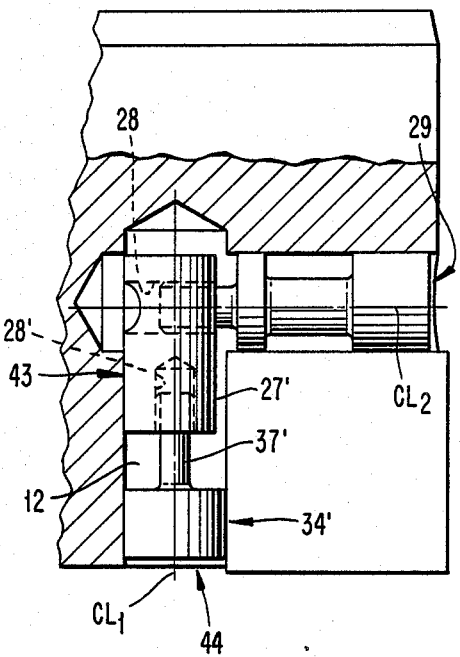

MILLING CUTTER

BACKGROUND AND OBJECTS OF THE INVENTION

The present invention relates to a milling cutter for chip machining of metallic workpieces equipped with indexable cutting inserts. The milling cutter comprises a milling cutter body having a plurality of peripheral recesses, each recess being adapted to receive a clamping device, an adjustment element and a cutting insert. The adjustment element and the cutting insert are arranged in abutment with each other. The adjustment element has a central axis around which said element is arranged to be rotated to cause displacement of said insert. The clamping device is arranged to provide location of the insert in an adjusted position. The milling cutter has an axis of rotation and a direction of rotation.

A milling cutter of such a design as is disclosed in U.S. Pat. No. 3,195,376. A wedge-shaped adjustment element received in a recess of said milling cutter body is arranged to abut against one edge surface of the insert. Upon rotation of said element the insert is displaced in one direction. This known type of milling cutter has several drawbacks. In this tool it is not possible to provide simple adjustment of the insert in several directions. The form of the wedge does not provide an adjustment surface for accurate adjustment which might cause tilting of the insert during machining. It is necessary to use a special tool for wedge adjustment.

It is an object of the present invention to provide a milling cutter with adjustable cutting insert.

It is another object of the invention to provide a milling cutter with rotatable adjustment elements which are securely fastened against centrifugal forces.

It is another object of the invention to provide a milling cutter provided with adjustment elements having cam surfaces which upon rotation will exactly take the desired position for each cutting insert.

Still another object of the invention is to provide a milling cutter which has an advantageous design from a constructive and economical point of view.

Still another object of the invention is to provide a milling cutter with adjustment elements in which such adjustment element in its recess is able to provide adjustment of the insert mainly in the radial direction or mainly in the axial direction of the tool.

Another object of the invention is to provide a milling cutter in which every adjustment element in its recess is able to provide adjustment of the insert in both the radial and the axial direction of the tool.

Yet another object of the invention is to provide a milling cutter in which every cutting insert by means of a clamping device can be securely fastened into an adjusted position.

Yet another object of the invention is to provide a milling cutter equipped with adjustment means that can be handled by means of a simple key.

THE DRAWINGS

The invention will now be described more in detail in connection with the enclosed drawings, in which FIGS. 1-3 show a portion of a cutter body with recesses in perspective view, in end view and in side view respectively, FIG. 4 shows a portion of a milling cutter in accordance with the invention, partly in cross section, FIGS. 5 and 6 show a side view in direction of arrow V and an end view in direction of arrow VI in FIG. 4, FIGS. 7, 8 and 9 show an alternative embodiment of a milling cutter of the invention in views corresponding with FIGS. 4, 5 and 6.

DESCRIPTION OF PREFERRED EMBODIMENTS OF THE INVENTION

Figure 1:
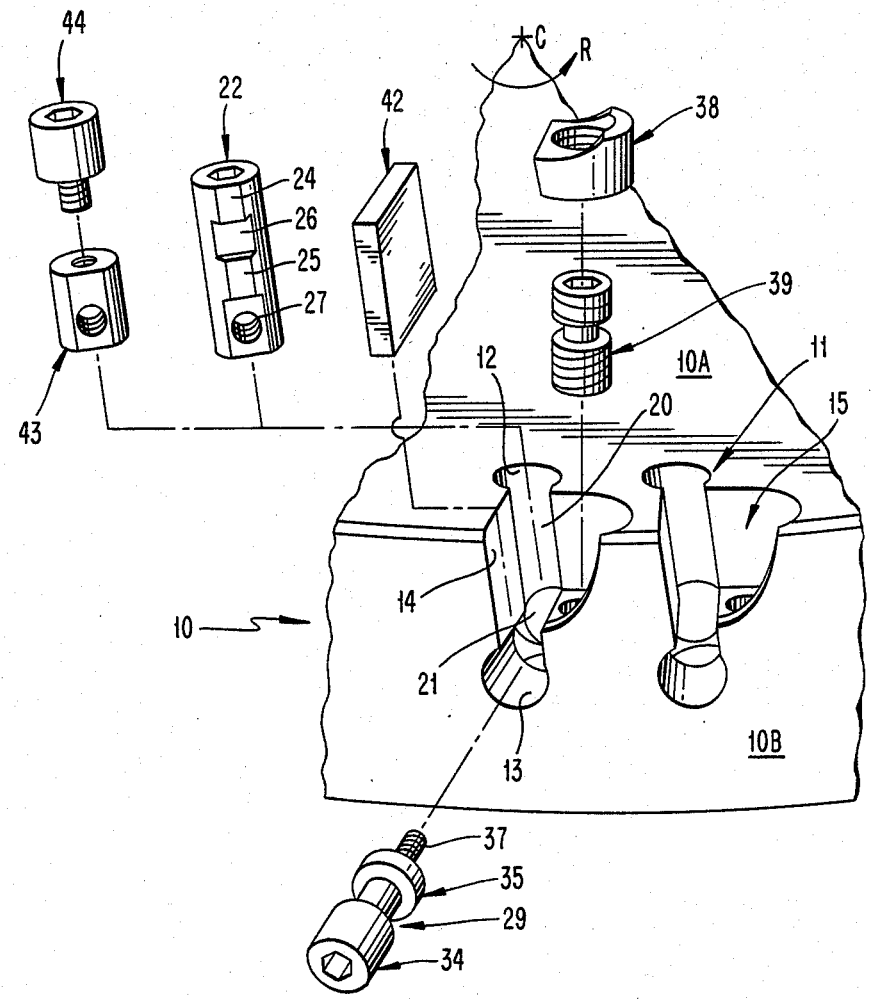
Figure 5:
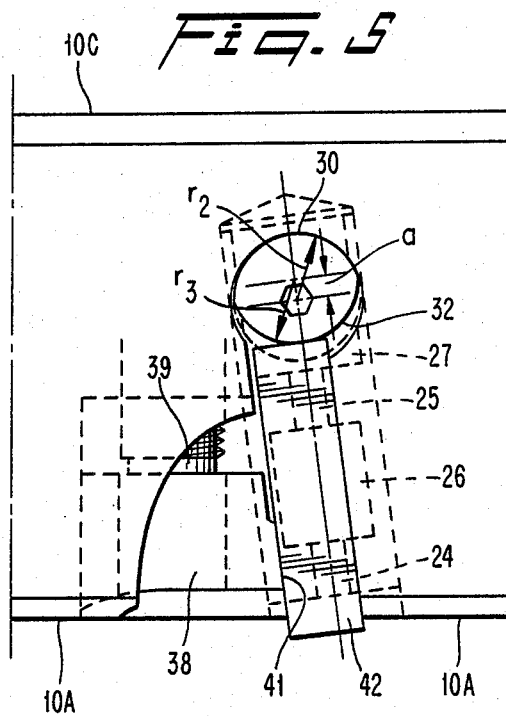
Figure 6:
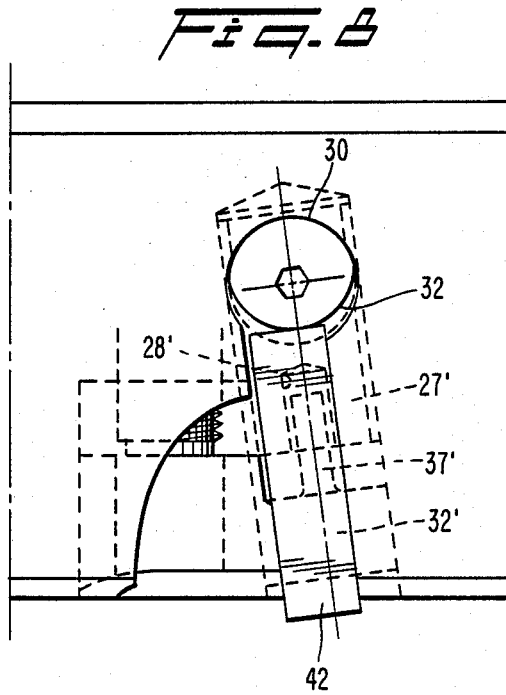
Figure 6:
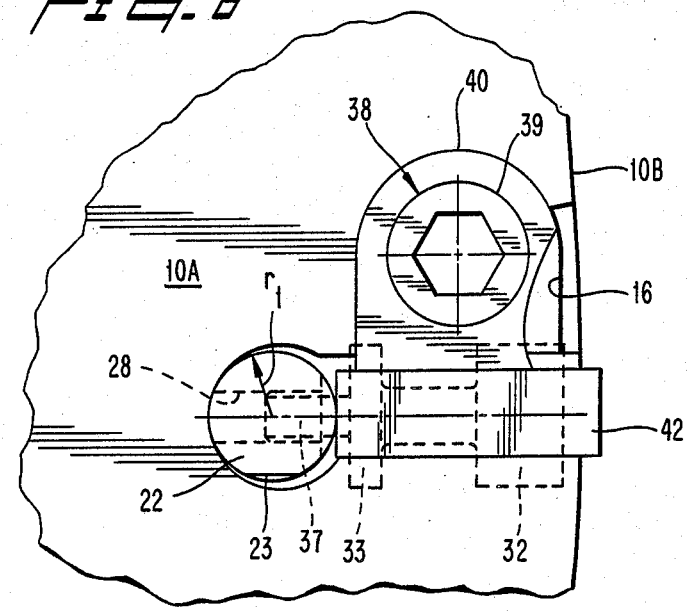

The milling cutter body 10 in FIGS. 1-3 is annular shaped and is provided with a number of peripheral recesses 11 which extend both to the underneath side 10A and to the mantle surface 10B of the cutter body. The cutter body has a top surface 10C and an opposed bottom surface 10A. Each recess 11 includes two mainly perpendicularly related bores 12 and 13 each of which in their length directions extends to a first support surface 14. The milling cutter body 10 has an axis of rotation R in relation to a centre point C. The recess 11 also includes a pocket 15 to receive a clamping device such as a wedge. The pocket 15 includes two at least partially plane parallel side walls 16, a cylindrically curved second support surface 17 therebetween and a bottom surface 18. The side walls and second support surface are mainly perpendicular in relation to said bottom surface. A radially outer side wall 16 is partially recessed in a direction towards the mantle surface 10B to improve chip removal. The radially inner side wall 16 might have a recess to provide guidance. A threaded hole 19 is provided perpendicular while extending into the bottom surface 18. The pocket 15 is open towards a first support surface 14. The first support surface 14 is plane and inclined in relation to the centre line of the threaded hole so that they converge in direction towards the top surface 10C.

The bores 12 and 13 have both a generally cylindrical shape of same radius of the a size between 2 and 10 mm. Both these bores are open in length direction towards said first support surface 14 by the provision of slots 20 and 21 which intersect with each other in the area around the axially uppermost and radially innermost corner of said support surface 14. The foremost wall portion of said slots 20, 21, seen in the direction of rotation, extends to the radially inner side wall 16 and said bottom surface 18, respectively. The width of said slots 20, 21 as seen in the direction of rotation is smaller than the diameters of the bores 12 and 13.

Referring now to FIGS. 1-6 those elements will be described which are to be fastened to the milling cutter body 10.

One of these bores 12, 13 is intended to receive a preferably solid support element 22 which has a cylindrical form with a radius r, somewhat smaller than the radius of said bore. This support element can also be formed as a nonsolid element, for instance tube shaped or as a slotted element. The length of said support element exceeds the diameter of the circle circumscribed by said cutting insert whilst being less than 2 times said diameter. The support element 22 has a centre line CL1 that is parallel with a bevelled surface 23 (FIG. 6) whereby said bevelled surface constitutes a chord in the basic form of said element. This bevelled surface merely provides a clearance for said bore 12. There are two longitudinally spaced support surfaces 24 and 25 oriented perpendicularly to the bevelled surface 23 which are surrounded by clearance surfaces 26 and 27. These clearance surfaces are provided for the purpose of limiting the extension of said support surfaces 24 and 25 such that these can precisely define an abutment plane for a cutting insert. A threaded bore 28 is provided at one end of said support element. This bore 28 is oriented parallel with bevelled surface 23 whilst being located centrally and perpendicular in relation to the clearance surface 27. The bore 28 might be only partially threaded adjacent clearance surface 27. The support surface 24 is arranged at the opposite end of said support element and extends axially to an extent of about one fifth (1/5) of the length of said element. The support surface 25 is arranged at the middle of said support element and has the same axial extension as support surface 24.

The second bore is provided for the receipt of a solid or non-solid adjustment element 29 which is basically cylindrical in shape having a radius $r_2$ which is approximately equal to the radius $r_1$ of said support element, i.e. somewhat less than the radius of bore 12. The length of the adjustment element is equal or less than the length of the support element 22. The adjustment element has a centre axis $CL_2$ which defines a longitudinal axis common to two cylindrical support surfaces 30 and 31, each of which includes a circle sector of about 180°. Each support surface joins i.e., is contiguous with, a cam surface or adjustment surface 32, 33. Each adjustment surface is defined by a radius $r_3$ which is equal to or larger than radius $r_2$ and the centre of which is displaced a distance a from the centre of the radius for the support surface 30. The distance a is at maximum equal to half the radius $r_2$. This displacement occurs along an imaginary line towards the support surface 30 which divides said circular sector in two equal portions. Adjustment surfaces and support surfaces 30–33 are located on two spaced separate flanges 34 and 35. One flange 34 has a larger width than the other flange 35. The wider flange is located at one end of said element. The thinner flange is arranged somewhat displaced from the centre of said element in a direction towards the other end of said element. In certain cases the adjustment surface 33 of the thinner flange is not needed due to said surface being taken away. A cylindrical portion 36 is provided between said flanges. Portion 36 is coaxial in relation to the centre line $CL_2$ and is defined by a radius which is smaller than radius $r_2$. A tap 37, preferably threaded, extends coaxially in relation to the centre line $CL_2$ from the thinner flange 33. The tap 37 has a radius which is smaller than radius $r_2$ and has an extension which is adapted to its place of location. One end of said adjustment element is provided with a recess for an Allen key.

Each pocket 15 in the milling cutter body 10 is arranged to receive a wedge 38 and a screw 39. The wedge 38 includes a cylindrical support surface 40, a threaded bore, the centre line of which is parallel with support surface 40, and a clamping surface 41.

The clamping surface 41 has a stepped configuration for obtaining an accurately defined abutment surface against the cutting insert 42. The clamping surface is plane and provided at an acute angle in relation to the centre line of the bore, i.e. the clamping surface and the centre line converges in direction towards the top surface of the milling cutter body. The clamping surface is radially oriented beyond the imaginary circle which to a large extent coincides with the support surface 40 for balancing the wedge when tightening said screw. The screw 39 might be a so-called shroud screw, the end portions of which is provided with oppositely threaded portions. The wedge portion which is faced radially outwards in the milling cutter body is provided with a concave recess for the purpose of improving the chip flow during the milling operation.

The mounting of the milling cutter is described in the following. The support element 22 is entered into one of the bores 12 or 13 depending of which type of insert adjustment, radial or axial, that is desirable. In the embodiment shown in FIGS. 1–6 said support element is entered into the bore 12 so that its support surfaces 24 and 25 are facing the slot 20 and such that its threaded bore 28 is oriented in line with the centre line of the other bore 13. Adjustment element 29 is thereafter inserted in the bore 13 by first entering its threaded tap portion 37 until said tap abuts against the support element. The adjustment element is then subjected to rotation so that the threads of said tap engage with the threads of the bore 28 whereby said adjustment element is displaced towards said support element. As an alternative the support element might be received in a bore without threads whereby said threaded tap portion is received in a threaded bore in the cutter body, said threaded bore being coaxial in relation to the centre line of the bore 12. In such case the length of the adjustment element exceeds the length of the support element. The size of the cutting insert 42 is the factor which governs to which extent the support element shall be tightened. The adjustment element is then adjusted to the position shown in FIG. 5, i.e. such that the adjustment surfaces 32 and 33 are located as far as possible from the slot 21. The screw 39 is then at one end tightened into the threaded bore of the wedge 38 to a certain extent after which the opposite end of said screw is threadedly engaged to some extent into the threaded bore 19 of the pocket 15. The cutting insert 42 is thereafter entered between the wedge 38 and the first support surface 14 so that two edge surfaces of the insert come into abutment with adjacent surfaces 24, 25 and 32, 33 on the elements 22 and 29 respectively. The wedge might be brought into a certain clamping engagement with the cutting insert in order to prevent the same from becoming loose during mounting thereof. The adjustment element 29 is thereafter rotated whereby the adjustment surfaces 32 and 33 will push the insert in a direction away from the element 29. The element 29 is then rotated until the insert has entered its desired position. This position is firmly secured by complete tightening of shroud screw 39 whereby the insert is tilted in relation to the direction of the wedge's linear movement. When the insert is so positioned the adjustment element must not necessarily be in contact with the insert and can therefore during the milling operation be subject of rotation half a revolution as maximum, i.e. the adjustment element cannot come apart from the support element.

The above related pocket 15 can alternatively be provided so as to receive and support the wedge 38 in a direction that is angularly displaced, for instance 90°, in relation to the position as shown, i.e. such that the threaded bore 19 is oriented perpendicularly in relation to the mantle surface 10B of the milling cutter. As an alternative the pocket, the wedge and the screw might be replaced by a clamping arm that is integral with the milling cutter body and which can be actuated by a clamping device.

An alternative embodiment of the milling cutter of the invention is shown in FIGS. 1, 7, 8 and 9. In these Figures the same designation numbers are used to identify identical details. In this alternative embodiment the support element 22 in the milling cutter has been replaced by a connecting piece 43 and an adjustment piece 44, said first piece 43 having a design corresponding with said first end portion of the support element 22 whereby the clearance face 27' extends entirely along said piece 43. The length of piece 43 is about half the length of the support element. The connecting piece has a bore 28 in perpendicular relation to the clearance face 27'. The other end surface of said connecting piece is mainly plane and oriented substantially perpendicularly in relation to the clearance face 27'. A central bore 28', preferably threaded, is arranged perpendicularly from said end surface and is consequently perpendicular in relation to the bore 28. The adjustment piece 44 has a flange 34' the design of which corresponds with the wider flange 34 on the adjustment element 29. A tap portion 37', preferably threaded, extends from the flange 34' in coaxial relation with the central axis of the flange 34'. The length of the adjustment piece 44 is about half the length of the adjustment element 29. The tap 37' and the bore 28' have preferably the same axial length and is a matter of free choice. The end portion of the adjustment piece not facing the tap is provided with a recess for an Allen key.

Figure 9:
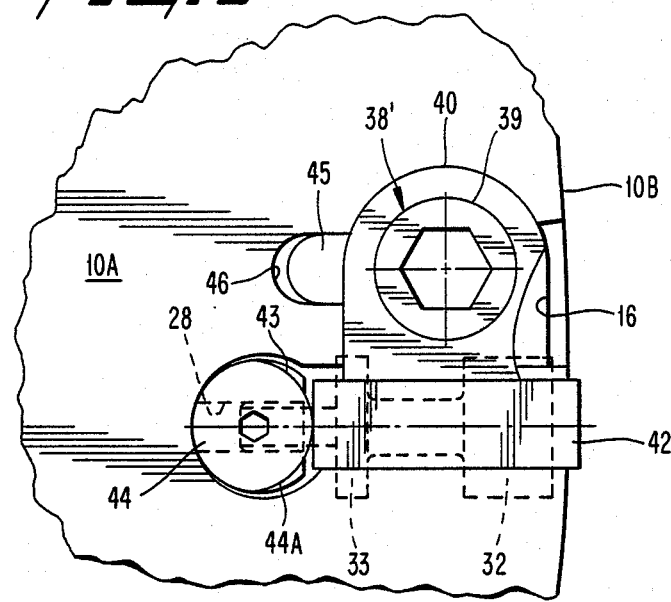

In FIG. 9 is illustrated a wedge 38' having an alternative design with an extension 45 on its outer surface to engage with a complementary recess 46 in the radially inner side wall 16 of the pocket. The extension and the recess are intended to match for the purpose of preventing non-desired rotation of the wedge. The design of the wedge 38 can be advantageous when used with a milling cutter such as shown in FIGS. 1, 2, 3 and 6.

The mounting of this alternative milling cutter occurs in the same manner as for the first mentioned milling cutter except that the tap 37' of the adjustment piece 44 is threadedly engaged with the bore 28' of the connecting piece 43 whereby said pieces are displaced as one unit into the bore 12 or 13 in the milling cutter 10. The adjustment element 29 is then connected with the connecting piece 43 after which the wedge 38 is brought to abutment with the cutting insert 42. The adjustment piece 44 is then rotated so that an adjustment surface 44A thereof effects a radial adjustment of the cutting insert after which the adjustment element 29 is rotated for making axial adjustment of the cutting insert. Thereafter the insert is located into its fixed position. Hence, the cutting insert can be adjusted in two directions the mechanisms of which are independent from each other.

The milling cutter of the present invention provides a solution of several problems that occur when using milling cutters with adjustable cutting inserts. Cutting inserts which have not been subject of precision grinding sometimes appear to have incorrect tolerances which can easily be compensated with the present invention. The support and adjustment elements are connected with each other which means that their risk of being thrown out is eliminated with this invention. In accordance with one embodiment the support and adjustment elements are solid and therefore exhibit high strength. The support and adjustment elements can, at free choice, be so arranged in the cutter body that either radial or axial adjustment of the cutting insert is made possible. It is possible for instance to have all inserts except one or two arranged for radial adjustment while the remaining inserts, so-called wiper inserts, could be arranged for axial adjustment. The support and adjustment elements can also be arranged so that both radial and axial adjustment of the insert is made possible.

I claim:

1. Milling cutter comprising a cutter body having multiple peripheral recesses, each said recess being adapted to receive an adjustment element and an indexible cutting insert in abutment with each other, said adjustment element having a central axis around which said adjustment element is rotatable to provide displacement of said insert, and a clamping device received in said recess and arranged for fixedly locating the insert in its adjusted position, said milling cutter having a rotation center and a direction of rotation, a separate second element received in said recess and arranged to abut against the insert, said adjustment element being threadably connected to said second element for rotation relative thereto, both said second element and said adjustment element being cylindrically shaped with substantially equal radii, each said recess comprising two bores oriented essentially perpendicular to each other for the receipt of said adjustment element and said second element, respectively.

2. Milling cutter according to claim 1, wherein each bore is cylindrical in shape and both slots open radially into a slot portion of said recess, an essentially planar portion of said recess constituting a wall of said slot portion and defining a support surface arranged to abut against a rear surface of the insert which faces away from the rotation direction.

3. Milling cutter according to claim 1, wherein said second element comprises two rotatable parts rotatable in relation to each other of which a first part thereof is spaced from the cutting insert and located adjacent said adjustment element and a second part thereof being arranged in contact with the cutting insert while being threadably connected with said first part via a matching bore and a top, said second part including an adjustment surface for adjusting the insert in response to rotation of said second part.

4. Milling cutter according to claim 1, wherein said adjustment element includes a support surface extending for about 180 degrees and an adjusting surface arranged contiguously with said support surface, an axis of said support surface coinciding with said central axis of said adjustment element, said adjusting surface shaped to adjust the insert in response to rotation of said adjustment element.

5. Milling cutter according to claim 4, wherein said support surface is defined by a first radius the center of which coincides with the central axis of said adjustment element, the adjustment surface being defined by a second radius at least as large as said first radius, the center of said second radius being offset from the center of said first radius.

6. Milling cutter according to claim 5, wherein said adjustment element includes first and second flanges spaced apart in the direction of said central axis of said adjustment element, each of said flanges carrying a portion of said support surface and a portion of said adjustment surface, said first flange being longer than said second flange in a direction parallel to said last-named central axis, said first flange being located at one end of said adjustment member, and an opposite end of said adjustment member including a threaded tap threadedly connected to said second element.

7. Milling cutter according to claim 1, wherein said second element includes a flat beveled surface extending parallel to a longitudinal center line of said second element, and at least one flat support surface disposed perpendicular to said beveled surface, said at least one flat support surface terminating longitudinally at a clearance face of said second element which extends parallel to said at least one flat support surface, a bore formed in one end of said second element and extending perpendicular to said center line, said adjustment element including a tap threadedly secured in said last-named bore.

8. Milling cutter according to claim 7, wherein said at least one flat support surface of said second element comprises first and second flat support surfaces spaced apart by said clearance face, said last-named bore being formed in one of said flat support surfaces.

9. Milling cutter according to claim 1, wherein each of said recesses comprises a pocket having two mutually parallel side walls, an intermediate concave, cylindrically curved surface, and a flat bottom surface oriented perpendicularly to said side walls and said curved surface, said bottom surface having a first threaded bore disposed in perpendicular relation thereto, said pocket being open towards the insert, said clamping device including a wedge having a mainly cylindrical support surface, a second threaded bore, and a clamping surface facing the insert and oriented at an acute angle with the center line of said second threaded bore, said screw being threadedly insertable into said first and second threaded bores to bring said support surface into abutting relationship with said curved surface.

* * * * *